(No Model.)

C. B. & J. S. BOREN.
HORSE POWER.

No. 291,283. Patented Jan. 1, 1884.

WITNESSES:
Thos Houghton.
John E. Kemon

INVENTORS:
C. B. Boren
J. S. Boren
BY Munn & Co.
ATTORNEYS.

UNITED STATES PATENT OFFICE.

CHARLES B. BOREN AND JOHN S. BOREN, OF BOONEVILLE, MISSISSIPPI.

HORSE-POWER.

SPECIFICATION forming part of Letters Patent No. 291,283, dated January 1, 1884.

Application filed November 10, 1883. (No model.)

*To all whom it may concern:*

Be it known that we, CHARLES B. BOREN and JOHN S. BOREN, citizens of the United States, residing at Booneville, in the county of Prentiss and State of Mississippi, have invented certain new and useful Improvements in Horse-Powers, of which the following is a description.

Our invention relates to improvements in horse-powers; and it consists in the peculiar construction and arrangement of the parts, as hereinafter more fully set forth, and pointed out in the claims.

Figure 1:
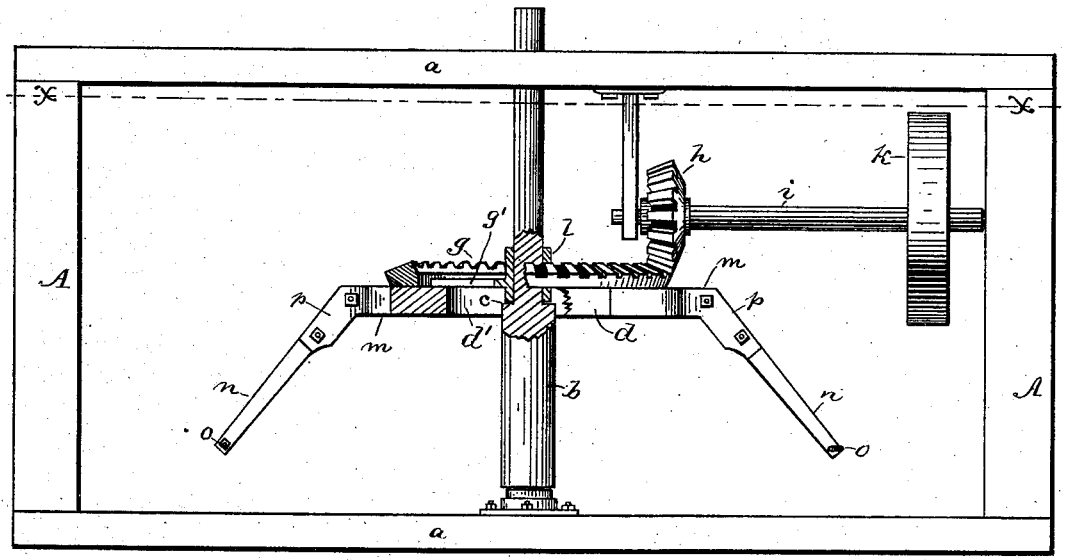
Figure 2:
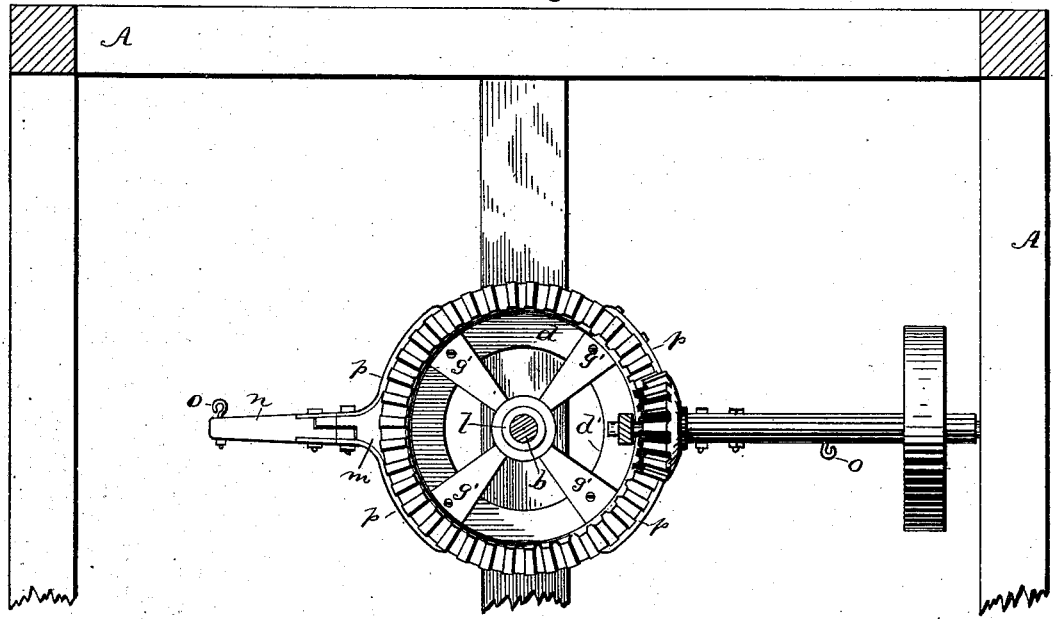

Figure 1 is a side elevation, partly in section, of our improved horse-power; and Fig. 2 is a sectional plan view thereof, with parts broken away.

Referring to the drawings, A represents a wooden frame, in the cross-sills $a\ a'$ of which are stepped the upright shaft or king-post $b$. The vertical shaft $b$ is provided, at a height greater than that of a horse or man, with a shoulder, $c$, and the upper part of the shaft $b$, from the shoulder $c$ to its upper end, is made of less diameter than the lower end of the shaft $b$ below the shoulder.

$d$ represents a circular piece of wood or other suitable material, provided with a large central circular orifice, $d'$.

$g$ represents a horizontal master-wheel, having cogs on its upper face near its circumference, which engage with a vertical cog-wheel, $h$, on the inner end of a horizontal shaft, $i$, having its bearings in the frame A, and carrying at its outer end a band-pulley, $k$, whereby the power is transmitted to a cotton-gin, saw-mill, or other machine. The master-wheel $g$ is provided with two radial arms, $g'$, in line with each other, and at right angles to two other radial arms in line with each other, all the radial arms $g$ being secured at their inner ends to a hollow cylinder or ferrule, $l$, which is passed over the reduced upper end of the upright shaft $b$, and rests on the shoulder $c$ of said shaft, which thus supports the master-wheel at such a distance above the ground that a man or horse can pass under it. The radial arms $g$ are secured near their outer ends to the ring $d$ by screws passing through holes in the radial arms $g$, and thence into the ring $d$.

$m\ m$ represent lugs or projections, the inner ends of which are secured to the ring $d$, and project radially from its circumference, and the outer end of each lug $m$ is secured at its outer end to a downwardly and outwardly inclined lever, $n$, provided at its lower end with a hook, $o$, to which the single-tree of a horse is attached.

To the sides of the lugs $m$ are secured the straps $p$, which, near the ends of the lugs, are formed into arcs of circles, embracing a part of the ring $d$, and provided with holes for the passage of nails or screws, which secure them to the ring $d$. The lug $m$ and lever $n$, to which the horse is attached, thus form an elbow-lever. By this construction it will be seen that the vertical shaft or king-post is relieved of all torsional strain, and that the master-wheel is so elevated that a man or beast can readily pass under it.

What we claim as our invention, and desire to secure by Letters Patent, is—

1. In a horse-power, the combination, with the vertical shaft $b$, provided with an elevated shoulder, $c$, and a reduced diameter above said shoulder, of the master cog-wheel $g$, having radial arms $g'$, ferrule $l$, ring $d$, and elbow-levers $m\ n$, substantially as shown and described.

2. In a horse-power, the combination, with the frame A and vertical shaft $b$, provided with an elevated shoulder, $c$, and a reduced diameter above said shoulder, of the horizontal master cog-wheel $g$, having radial arms $g'$, and ferrule $l$, ring $d$, elbow-levers $m\ n$, having straps $p$, secured to said ring, horizontal shaft $i$, carrying cog-wheel $h$ on one end and band-pulley $k$ on its opposite end, substantially as described, and for the purpose set forth.

CHARLES B. BOREN.
JOHN S. BOREN.

Witnesses:
R. M. HALE,
P. M. WALKER.